Figure 1:
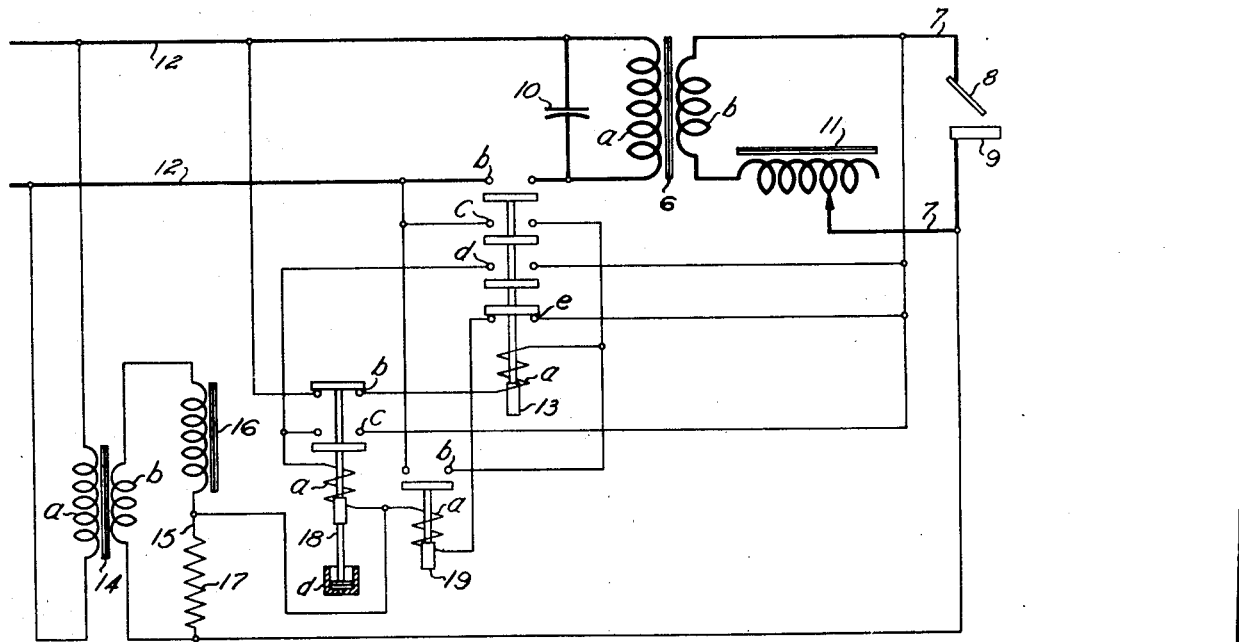

Oct. 25, 1949.        D. JOURNEAUX         2,486,166
              WELDING TRANSFORMER CONTROL SYSTEM
Filed April 25, 1946                 2 Sheets-Sheet 1

INVENTOR
Didier Journeaux

Oct. 25, 1949.  D. JOURNEAUX  2,486,166
WELDING TRANSFORMER CONTROL SYSTEM

Filed April 25, 1946  2 Sheets-Sheet 2

INVENTOR
Didier Journeaux

Patented Oct. 25, 1949

2,486,166

UNITED STATES PATENT OFFICE 2,486,166

WELDING TRANSFORMER CONTROL SYSTEM

Didier Journeaux, Wauwatosa, Wis., assignor to Allis-Chalmers Manufacturing Company, Milwaukee, Wis., a corporation of Delaware Application April 25, 1946, Serial No. 664,781

6 Claims. (Cl. 323—62)

This invention relates in general to improvements in control systems for welding transformers, and more particularly to means for automatically rendering a welding transformer inoperative when the associated welding circuit becomes short circuited or open circuited.

The supply of alternating current to welding electrodes is frequently effected through a transformer having a secondary open circuit voltage of sufficient magnitude to subject an operator touching both electrodes simultaneously to shock or to greater hazards. The transformer may also be seriously damaged if the secondary winding thereof remains short circuited for a considerable length of time. It is therefore desirable to render the transformer inoperative whenever the associated welding circuit is idle or short circuited.

During normal operation of the transformer, the voltage of the welding circuit has a magnitude which remains within the limited range of values, and its phase angle with respect to the supply voltage also remains within a limited range of values. To detect abnormal conditions in the welding circuit, it is therefore convenient to compare the actual voltage of the welding circuit to a reference voltage of which the magnitude and phase are within the normal range. All departures of the voltage of the welding circuit from the normal range can thus be detected by a single voltage responsive device. When the welding current is regulated by inductive means the voltage of the source and of the welding circuit do not coincide in phase, and a reference voltage of the correct phase is preferably obtained by means of an inductive voltage divider energized from the source.

It is therefore an object of the present invention to provide an improved system for rendering a welding transformer inoperative when the associated welding circuit is idle or short circuited, in which a single current responsive device detects any departure of the voltage of the welding circuit from the normal range thereof.

Another object of the invention is to provide an improved system for rendering a welding transformer inoperative when the associated welding circuit is idle or short circuited, in which the actual voltage of the welding circuit is compared to a reference voltage of magnitude and phase within the range of normal magnitudes and phases of welding circuits.

Another object of the present invention is to provide an improved system for rendering a welding transformer inoperative when the associated welding circuit is idle or short circuited, which is selectively responsive to variations in the phase relation between the voltages of the source and of the welding circuit.

Figure 2:
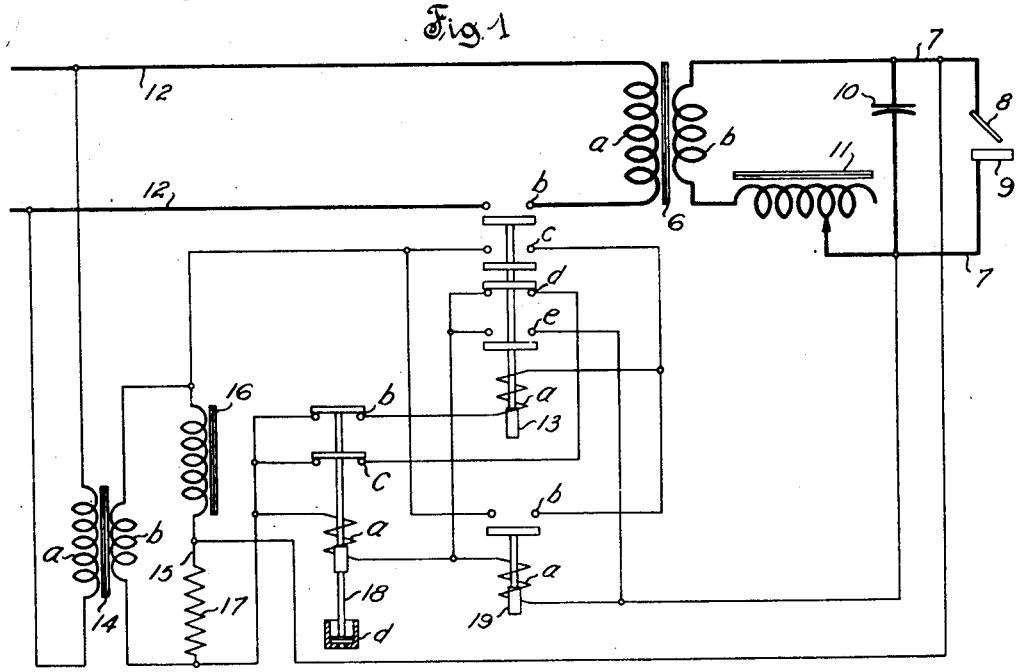
Figure 3:
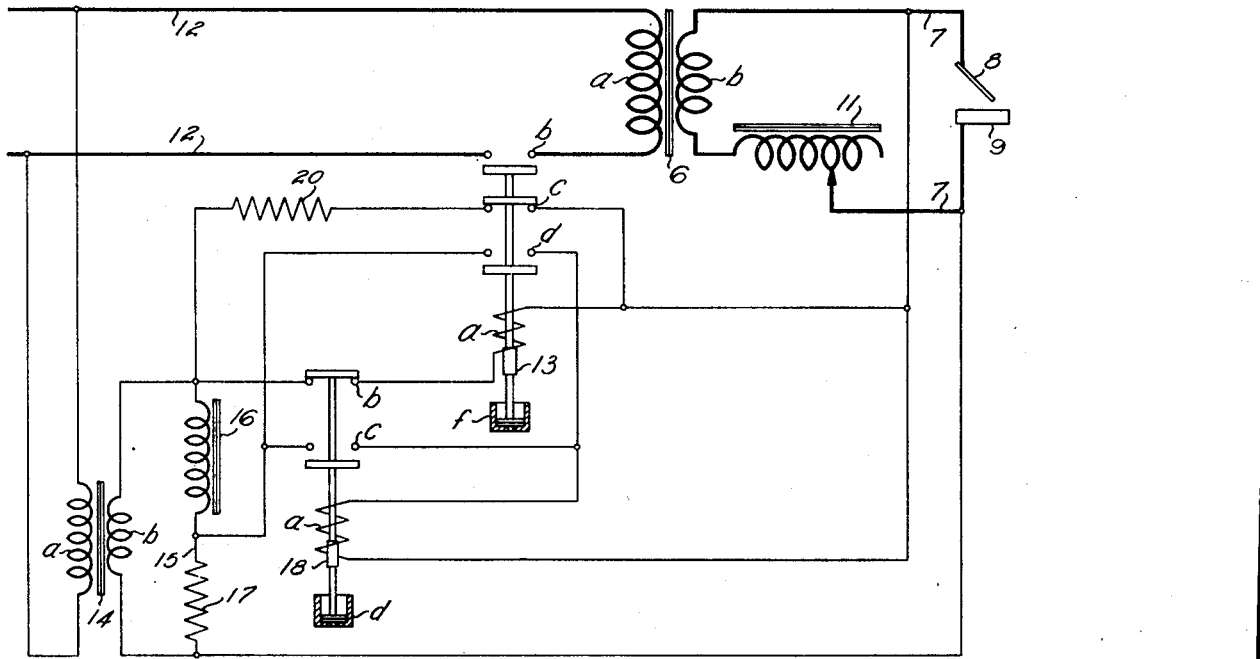
Figure 4:
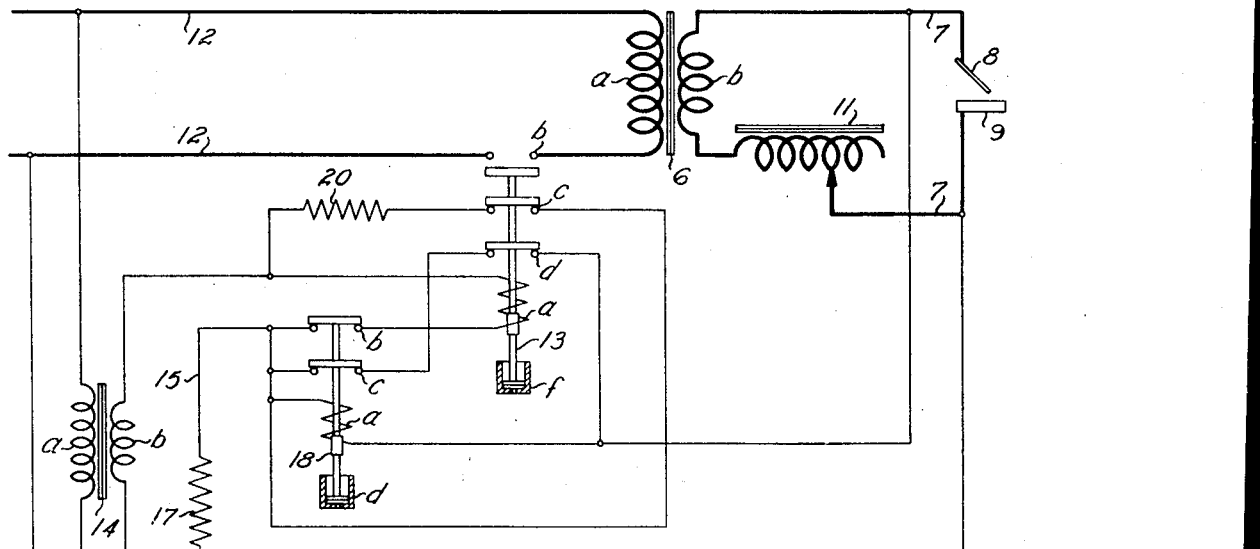

Objects and advantages other than those above set forth will be apparent from the following description when read in connection with the accompanying drawing, in which:

Fig. 1 diagrammatically illustrates one embodiment of the present invention in which the actuating coil for the switch connecting a welding transformer to a source is to be directly energized from the source;

Fig. 2 diagrammatically illustrates a modified embodiment of the present invention in which the switch actuating coil is energized from a transformer supplying current to a voltage divider furnishing a reference voltage;

Fig. 3 diagrammatically illustrates another embodiment of the present invention in which the switch actuating coil is connected in a bridge circuit comprising the welding transformer secondary winding as an element thereof; and Fig. 4 diagrammatically illustrates a further modified embodiment of the present invention in which the actuating coil is a part of the voltage divider furnishing the reference voltage.

Referring more particularly to Fig. 1 of the drawing by characters of reference, numeral 6 designates a welding transformer provided with a primary winding 6a and a secondary winding 6b. The secondary winding is connected with a welding circuit 7 for supplying current to a pair of electrodes 8, 9. Electrode 8 is assumed to be a rod of weld metal and electrode 9 the work to be welded. A capacitor 10 of suitable size may be connected across winding 6a if it is desired to raise the power factor of the current supplied to the system from the source.

The flow of current through electrodes 8, 9 is adjustably limited by causing the path of the current flowing through winding 6a or through winding 6b to have a substantial impedance. The latter result may be obtained by so disposing windings 6a, 6b as to cause the leakage reactance thereof to have a substantial value or by connecting winding 6b to circuit 7 through impedance means such as an adjustable reactor 11 of any suitable type.

Winding 6a is to be connected with a suitable source of current such as a circuit 12 energized from a suitable generator (not shown) through connections including the main contacts 13b of a contactor switch 13. Operation of contacts 13b is controlled by a coil 13a adapted to actuate the armature of switch 13 when the coil is connected across circuit 12. Energization of coil 13a is controlled by means comprising a reference circuit for producing a reference voltage substantially equal to and in phase coincidence with the voltage appearing in circuit 7 in response to the flow of welding current therethrough, and an element differentially responsive to the reference voltage and to the actual voltage of the welding circuit.

The reference circuit may comprise an auxiliary transformer 14 provided with a primary winding 14a connected across circuit 12. The secondary winding 14b of transformer 14 is an undivided winding preferably having an open circuit voltage which is of the order of magnitude of the open circuit voltage of winding 6b. Winding 14b supplies current to a voltage divider 15 of such character as to produce the desired reference voltage. When the flow of current through circuit 7 is controlled by an inductive device such as reactor 11, the voltage divider preferably comprises an inductive section consisting of a reactor 16 and a resistive section consisting of a resistor 17. The elements of the voltage divider are so dimensioned that the voltage of resistor 17 is substantially equal to and in phase coincidence with the voltage appearing in circuit 7 in response to the flow of welding current therethrough. It will be understood that the magnitude and phase of the voltage of circuit 7 may vary within a limited range when the adjustment of reactor 11 is varied, and that it will be sufficient that the magnitude and phase of the voltage of resistor 17 be adjusted within such range.

For comparing the voltage of circuit 7 with the voltage of resistor 17, circuit 7 is connected across resistor 17 through the coil 18a of a current responsive relay 18. Contacts 18b of relay 18 control the connection of coil 13a with circuit 12. The speed of operation of relay 18 may be adjusted to any desired value by proper choice of the elements of the relay, which may include any suitable known delay means conventionally represented as a dashpot 18d.

To permit closure of contacts 13b in response to momentary short circuiting of circuit 7, relay 18 is associated with an instantaneously acting relay 19 provided with contacts 19b. The latter contacts are serially connected with contacts 18b through coil 13a and are bridged by contacts 13c. Coils 18a, 19a may be connected in parallel, and the sensitiveness of the system may be enhanced by selectively completing the connections of the two coils by means of contacts 13d, 13e and 18c. Contacts 13d are responsive to opening operation of switch 13 for causing relay 18 to become inoperative and contacts 13e are responsive to closing operation of switch 13 for causing relay 19 to become inoperative.

In operation, circuit 12 being energized with contacts 13b open and the elements of the system being in the position shown, winding 6a is disconnected from circuit 12. Winding 14a, however, is energized from circuit 12 and supplies current to voltage divider 15 to cause the voltage of resistor 17 to be substantially equal in magnitude and in phase to the voltage appearing in circuit 7 in response to the flow of welding current through an arc established between electrodes 8, 9. A relatively small amount of current flows from the voltage divider through coil 19a, winding 6b and reactor 11 to magnetize the core of transformer 6 and induce current in winding 6a and capacitor 10. Relay 19, however, is so adjusted as to be unresponsive to such current, which energizes circuit 7 at a value considerably below the open circuit voltage of winding 6b.

Welding operation may be initiated by momentarily bringing electrode 8 in contact with electrode 9. Circuit 7 is thereby momentarily short circuited and the full voltage of resistor 17 is impressed on coil 19a. Relay 19 closes contacts 19b, thereby completing the operative connection of coil 13a with circuit 12. Switch 13 closes contacts 13b which connect winding 6a with circuit 12, and closes contacts 13c to maintain coil 13a energized independently of subsequent opening of contacts 19b. Switch 13 also opens contacts 13e to render relay 19 inoperative and closes contacts 13d to render relay 18 operative.

Electrodes 8, 9 may then be separated to draw a welding arc therebetween. The voltage of circuit 7 then approximates the voltage of resistor 17 in magnitude and in phase to such an extent that the residual voltage impressed on coil 18a is insufficient to cause operation of relay 18.

When the flow of current through circuit 7 is interrupted by separation of electrodes 8, 9 beyond a predetermined distance, the flow of current through winding 6b and reactor 11 decreases to a negligible value. The voltage of circuit 7 becomes substantially equal in magnitude and in phase to the voltage of winding 14b. As a result of such change of magnitude and of phase, a voltage substantially equal to the voltage drop of reactor 16 is then impressed on coil 18a and, after a predetermined time delay, relay 18 opens contacts 18b to disconnect coil 13a from circuit 12. Switch 13 returns to the position shown, thereby returning the system to the condition thereof prevailing before engagement of electrodes 8, 9. The voltage impressed on coil 18a being greatly reduced thereby, relay 18 returns to the position shown and another welding operation may then be initiated by the renewed engagement of electrodes 8, 9.

If electrodes 8, 9 are held in contact for a substantial length of time, switch 13 first closes contacts 13b in the manner above set forth. The full voltage of resistor 17 is then impressed on coil 18a through contacts 13d and electrodes 8, 9 and, after a predetermined length of time, relay 18 opens contacts 18b to deenergize coil 13a. Winding 6a is thereby disconnected from circuit 12, and the short circuited welding electrodes are supplied with harmless current from winding 14b through reactor 16 and through contacts 13e and coil 19a in parallel with coil 18a and contacts 18c. Relay 19 closes contacts 19b without affecting the operation of the system as contacts 18b are then open. Relay 19 returns to the position shown upon separation of electrodes 8, 9. Relay 18 likewise returns to the position shown after a predetermined time delay to return the system to the condition thereof prevailing before short circuiting of electrodes 8, 9.

In the embodiment illustrated in Fig. 2, coil 13a is energized from winding 14b so that a single size of coil may be used in connection with supply circuits operating at different voltages. Capacitor 10 is shown connected across electrodes 8, 9 to stabilize the arc as well as improve the power factor of the system. Coils 18a, 19a are connected in series in the connection between resistor 17 and electrode 9. Contacts 13d, 18c, which must then be of the normally closed type, are connected in series with contacts 13e across the coils. The operation of the embodiment illustrated in Fig. 2 is substantially identical to that of the embodiment illustrated in Fig. 1.

In the embodiment illustrated in Fig. 3, coil 13a is connected between winding 14b and electrode 8. To allow a greater latitude in the choice of coil 13 the coil may be connected in parallel with suitable impedance means such as a resistor 20. The dissipation of energy in resistor 20 during normal welding operation may be avoided by connecting contacts 13c in series with the resistor.

Reactor 16, resistor 17, coil 13a in parallel with resistor 20, and winding 6b constitute the elements of a bridge defining input terminals connected with winding 14b and output terminals which are joined by coil 18a. Contacts 13d, 18c serve to render relay 18 unresponsive to unbalances of the bridge while winding 6a is disconnected from circuit 12.

In operation, circuit 12 being energized with contacts 13b open and the elements of the system being in the position shown in Fig. 3, winding 14b supplies current to circuit 7 through coil 13a in series with contacts 18b and through resistor 20 in series with contacts 13c. The elements of the system are so dimensioned that the voltage so impressed on coil 13a is slightly too low to cause closure of contacts 13b.

When electrodes 8, 9 are brought in contact to initiate a welding operation, the full voltage of winding 14b is impressed on coil 13a to cause closure of contacts 13b. When electrodes 8, 9 are separated to establish a welding arc therebetween, the voltage impressed on coil 13a is substantially equal to the voltage drop in reactor 16 and is sufficient to cause coil 13a to maintain contacts 13b closed. Contacts 13d are also closed but the two terminals of coil 18a are then at substantially the same potential and relay 18 does not operate.

When the welding arc is interrupted or is short circuited for a substantial length of time, relay 18 opens the circuit of coil 13a as in the embodiments illustrated in Figs. 1 and 2. As coil 13a is instantly deenergized in response to any rise of the voltage of circuit 7 to the open circuit value thereof, switch 13 may be provided with delaying means such as a dashpot 13f to prevent undesired opening of contacts 13b in response to momentary fluctuations of the arc voltage.

The embodiment illustrated in Fig. 4 differs from the embodiment illustrated in Fig. 3 principally in that coil 13a, which is of a generally inductive character, takes the place of reactor 16 in the voltage divider. The operation of the embodiment illustrated in Fig. 4 in substantially identical to that of the embodiment illustrated in Fig. 3.

Although but a few embodiments of the present invention have been illustrated and described, it will be apparent to one skilled in the art that various changes and modifications may be made therein without departing from the spirit of the invention or from the scope of the appended claims.

It is claimed and desired to secure by Letters Patent:

1. In a control system for a welding transformer comprising a primary winding to be connected across a source of alternating current and a secondary winding connected to a welding circuit, the combination of a switch for connecting said primary winding with said source, an actuating coil for controlling the operation of said switch, an auxiliary transformer connected to said source and provided with a secondary winding having an open circuit voltage substantially equal to the open circuit voltage of said welding transformer secondary winding, and means selectively responsive to variations in the phase relation between the voltages of said welding circuit and of said auxiliary transformer secondary winding for controlling the energization of said coil.

2. In a control system for a welding transformer comprising a primary winding to be connected across a source of alternating current and a secondary winding connected to a welding circuit, the combination of a switch for connecting said primary winding with said source, an actuating coil for controlling the operation of said switch, an auxiliary transformer connected to said source and provided with a secondary winding having an open circuit voltage substantially equal in magnitude and phase to the open circuit voltage of said welding transformer secondary winding; and means selectively responsive to variations in the phase relation between the voltages of said welding circuit and of said auxiliary transformer secondary winding for controlling the energization of said coil comprising a voltage divider connected across said auxiliary transformer secondary circuit, said voltage divider comprising an inductive section and a resistive section, means connecting said welding circuit across said resistive section and a current responsive means included in said connection.

3. In a control system for a welding transformer comprising a primary winding to be connected across a source of alternating current and a secondary winding connected to a welding circuit, the combination of a switch for connecting said primary winding with said source, an actuating coil for controlling the operation of said switch, an auxiliary transformer connected to said source and provided with a secondary winding having an open circuit voltage substantially equal in magnitude and phase to the open circuit voltage of said welding transformer secondary winding; and means selectively responsive to variations in the phase relation between the voltages of said welding circuit and of said auxiliary transformer secondary winding for controlling the energization of said coil comprising a bridge circuit including said welding transformer secondary winding as an element thereof, said bridge circuit defining input terminals connected with said auxiliary transformer secondary winding and output terminals, means connecting said welding circuit with said output terminals and a current responsive means included in said connection.

4. In a control system for a welding transformer comprising a primary winding to be connected across a source of alternating current and a secondary winding connected to a welding circuit, the combination of a switch for connecting said primary winding with said source, an actuating coil for controlling the operation of said switch, and means for controlling the energization of said coil comprising means for producing a reference voltage substantially equal to and in phase coincidence with the voltage appearing in said welding circuit in response to the flow of welding current therethrough and means differentially responsive to the magnitudes and phases of said reference voltage and of the actual voltage of said welding circuit.

5. In a control system for a welding transformer comprising a primary winding to be connected across a source of alternating current and a secondary winding connected to a welding circuit, the combination of a switch for connecting said primary winding with said source, an actuating coil for controlling the operation of said switch, and means for controlling the energization of said coil comprising a reference circuit energized from said source for producing a voltage substantially equal to and in phase coincidence with the voltage appearing in said welding circuit in response to the flow of welding current therethrough, a current responsive element connecting said welding circuit with said reference circuit, and means responsive to opening operation of said switch for causing said current responsive element to become inoperative.

6. In a control system for a welding transformer comprising a primary winding to be connected across a source of alternating current and a secondary winding connected to a welding circuit, the combination of a switch for connecting said primary winding with said source, an actuating coil for controlling the operation of said switch, means for controlling the energization of said coil comprising a reference circuit energized from said source for producing a voltage substantially equal to and in phase coincidence with the voltage appearing in said welding circuit in response to the flow of welding current therethrough, a current responsive element connecting said welding circuit with said reference circuit, and means responsive to closing operation of said switch for causing said current responsive element to become inoperative.

DIDIER JOURNEAUX.

REFERENCES CITED

The following references are of record in the file of this patent:

UNITED STATES PATENTS

| Number | Name | Date |
| --- | --- | --- |
| 2,351,910 | Blankenbuehler | June 20, 1944 |
| 2,364,372 | Kenrick | Dec. 5, 1944 |